US010056930B1

(12) United States Patent
Xu et al.

(10) Patent No.: US 10,056,930 B1
(45) Date of Patent: Aug. 21, 2018

(54) WIRELESS MICROPHONE RECEIVER AND METHOD IN THE WIRELESS MICROPHONE RECEIVER

(71) Applicant: Beken Corporation, Shanghai (CN)

(72) Inventors: Qunshan Xu, Shanghai (CN);
Huaming Jiang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/813,162

(22) Filed: Nov. 15, 2017

(30) Foreign Application Priority Data

Oct. 27, 2017 (CN) .......................... 2017 1 1057029

(51) Int. Cl.
*H03D 3/24* (2006.01)
*H04B 1/16* (2006.01)
*H04R 1/22* (2006.01)
*H04R 1/26* (2006.01)
*H04B 1/10* (2006.01)

(52) U.S. Cl.
CPC ............... *H04B 1/16* (2013.01); *H04R 1/227* (2013.01); *H04R 1/265* (2013.01); *H04B 2001/1072* (2013.01)

(58) Field of Classification Search
CPC .. H04B 1/16; H04B 2001/1072; H04B 1/227; H04R 1/265; H04L 12/282; H04W 56/0015; H04W 52/029
USPC .................................................. 375/373, 376
See application file for complete search history.

(56) References Cited

U.S. PATENT DOCUMENTS

| 2003/0053548 A1* | 3/2003 | Lee ........................ H04J 3/0632 375/259 |
| 2004/0125824 A1* | 7/2004 | Preston .................... G06F 1/12 370/519 |
| 2011/0273213 A1* | 11/2011 | Rama ................... H04W 52/029 327/291 |
| 2013/0094683 A1* | 4/2013 | Hansen .................. G09B 21/04 381/309 |
| 2013/0097510 A1* | 4/2013 | Maling, III ........... H04L 12/282 715/727 |
| 2017/0099644 A1* | 4/2017 | Kindred ............ H04W 56/0015 |

* cited by examiner

*Primary Examiner* — Phuong Phu
(74) *Attorney, Agent, or Firm* — Perkins Coie LLP

(57) ABSTRACT

A wireless microphone receiver comprises a phase locker to lock a phase of an audio data successfully received from a microphone transmitter; a calculator to calculate a frequency offset between the locked phase of the microphone receiver and the phase of the microphone transmitter; a calibrator to calibrate the frequency offset using a first step if the absolute value of the frequency offset is larger than a first predetermined threshold, and to calibrate the frequency offset with a second step if the absolute value of the frequency offset is smaller than or equal to the first predetermined threshold, and complete the calibration if a calibrated frequency offset is smaller than a second threshold; a buffer to buffer the audio data received from the microphone transmitter, and the calibrator further adjusts the amount of data stored in the buffer; and the microphone receiver further outputs buffered audio data.

10 Claims, 7 Drawing Sheets

WIRELESS MICROPHONE RECEIVER AND METHOD IN THE WIRELESS MICROPHONE RECEIVER

CROSS-REFERENCE TO RELATED APPLICATIONS

This application claims priority to Chinese Application number 201711057029.3 entitled "Wireless Microphone Receiver and Method in the Wireless Microphone Receiver," filed on Oct. 27, 2017 by Beken Corporation, which is incorporated herein by reference.

TECHNICAL FIELD

The present application relates to a digital circuit and more particularly, but not exclusively, to wireless microphone receiver and method in the wireless microphone receiver.

BACKGROUND OF THE INVENTION

A conventional wireless microphone system uses an analog modulation technology (such as frequency modulation, or FM), which does not have a high requirement on the frequency offset between a transmitter and receiver. However, such system is susceptible to interference, and cannot achieve the requirements of high-fidelity sound transmission.

A digital wireless microphone system uses a complete digital modulation, therefore the system is not susceptible to external interference, and the transmission will not lose audio information, which fully realizes high fidelity requirements. However, the digital system has a high requirement on frequency offset for the transceiver. For a stable transmission, the offset requirements is less than 1 parts per million (ppm). However, the frequency offset between the transmitter and receiver is usually greater than 20 ppm. Therefore it is desirable to have a method and device for the receiver to track the frequency of the transmitter, thus achieving the small frequency offset requirement.

BRIEF DESCRIPTION OF THE INVENTION

According to an embodiment of the invention, a wireless apparatus a wireless microphone transmitter configured to transmit audio data, and a wireless microphone receiver communicatively connected to the wireless microphone transmitter, wherein the wireless microphone receiver comprises a phase locker, configured to lock a phase of an audio data successfully received from the wireless microphone transmitter; a calculator communicatively coupled to the phase locker and configured to calculate a frequency offset between the locked phase of the wireless microphone receiver and the phase of the wireless microphone transmitter; a calibrator communicatively coupled to the calculator and configured to calibrate the frequency offset using a first step if the absolute value of the frequency offset is larger than a first predetermined threshold, and calibrate the frequency offset with a second step if the absolute value of the frequency offset is smaller than or equal to the first predetermined threshold, wherein the second step is smaller than the first step, wherein the calibrator is further configured to complete the calibration if a calibrated frequency offset is smaller than a second threshold; a buffer communicatively coupled to the calibrator and configured to buffer the audio data received from the wireless microphone transmitter, and the calibrator is further configured to adjust the amount of data stored in the buffer; and the wireless microphone receiver is further configured to output buffered audio data from the buffer; and an acoustic source communicatively connected to the wireless microphone receiver and configured to output audio signal based on the buffered audio data from the wireless microphone receiver.

According to another embodiment of the invention, a method in a wireless apparatus, wherein the wireless apparatus comprises a wireless microphone transmitter, a wireless microphone receiver and an acoustic source, and the wireless microphone receiver further comprises a phase locker, a calculator and a calibrator, wherein the method comprises: locking, by a phase locker, a phase of an audio data successfully received from the wireless microphone transmitter; calculating, by a calculator communicatively coupled to a phase locker, a frequency offset between the locked phase of the wireless microphone transmitter and the phase of the wireless microphone receiver; calibrating, by a calibrator communicatively coupled to the calculator and configured to the frequency offset using a first step if the absolute value of the frequency offset is larger than a first predetermined threshold, and calibrate the frequency offset with a second step if the absolute value of the frequency offset is smaller than or equal to the first predetermined threshold, wherein the second step is smaller than the first step, and completing, by the calibrator, the calibration if a calibrated frequency offset is smaller than a second threshold; buffering, by a buffer communicatively coupled to the calibrator, audio data received from the wireless microphone transmitter, adjusting, by the calibrator, the amount of data stored in the buffer; and outputting, by the wireless microphone receiver, buffered audio data from the buffer; and an acoustic source communicatively connected to the wireless microphone receiver and configured to output audio signal based on the buffered audio data from the wireless microphone receiver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details.

Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1A:
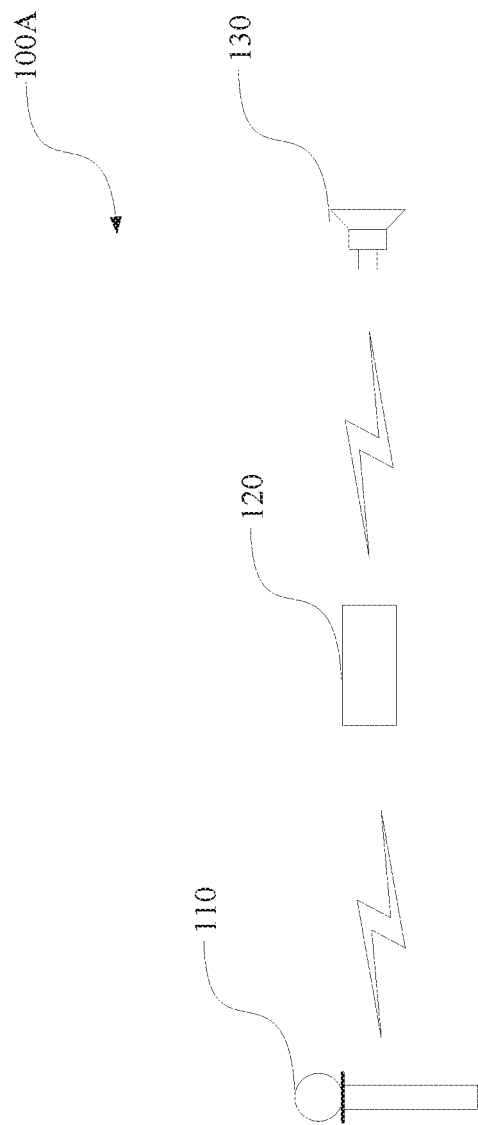
FIG. 1A is a drawing illustrating a wireless system according to an embodiment of the invention.

FIG. 1A is a drawing illustrating a wireless apparatus 100 according to an embodiment of the invention. The wireless apparatus 100 comprises a wireless microphone transmitter 110 configured to transmit audio data, a wireless microphone receiver 120 communicatively connected to the wireless microphone transmitter 110, and an acoustic source 130 communicatively connected to the wireless microphone receiver 120 and configured to output audio signal based on the buffered audio data from the wireless microphone receiver 120. The acoustic source 130 may be implemented by a speaker, a loud speaker, or any device that can convert an electrical audio signal into a corresponding sound.

Figure 1B:
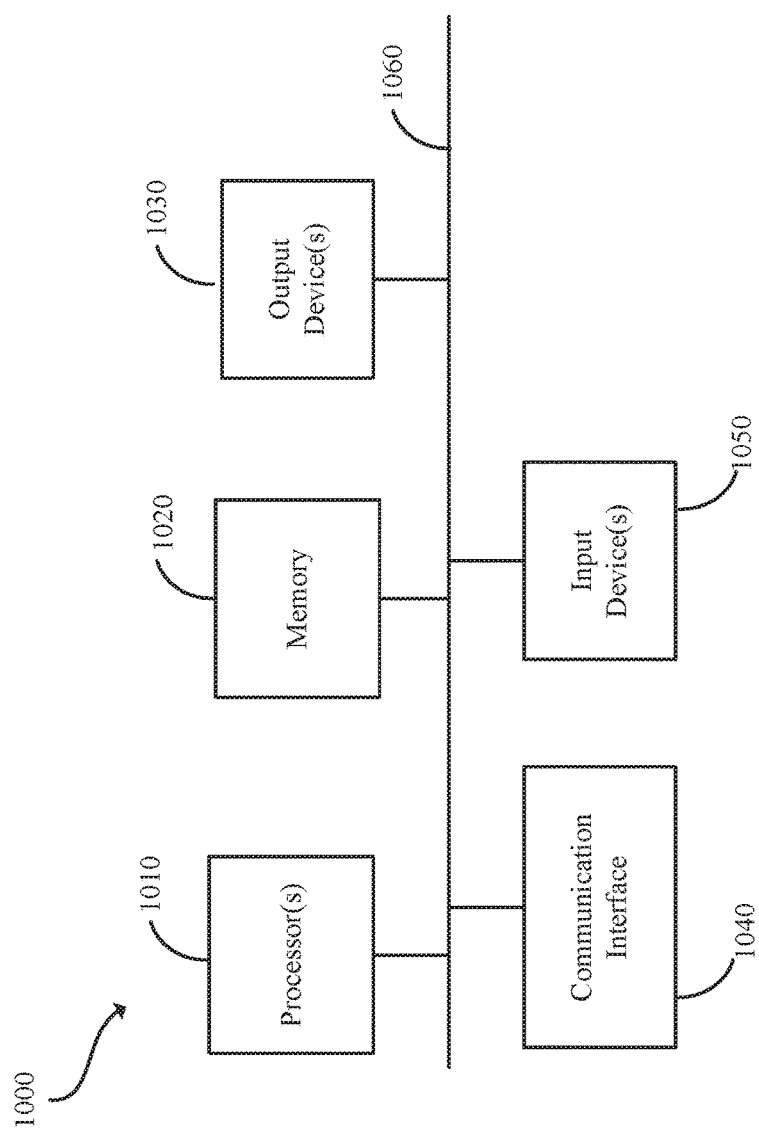
FIG. 1B is a high-level extent diagram showing an example architecture of the receiver of FIG. 1A.

FIG. 1B is a high-level extent diagram showing an example architecture 1000 of the wireless microphone receiver 120 of FIG. 1A. The architecture 1000 includes one or more processors 1010 and memory 1020 coupled to an interconnect 1060. The interconnect 1060 shown in FIG. 1B is an abstraction that represents any one or more separate physical buses, point to point connections, or both, connected by appropriate bridges, adapters, or controllers. The interconnect 1060, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, a CAN-bus (Controller Area Network), or an Institute of Electrical and Electronics Engineers (IEEE) standard 1394 bus, also called "Firewire", and/or any other suitable form of physical connection.

The processor(s) 1010 is/are the central processing unit (CPU) of the architecture 1000 and, thus, control the overall operation of the architecture 1000. In certain embodiments, the processor(s) 1010 accomplish this by executing software or firmware stored in memory 1020. The processor(s) 1010 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1020 is or includes the main memory of the architecture 1000. The memory 1020 represents any form of random access memory (RAM), read-only memory (ROM), flash memory, or the like, or a combination of such devices. In use, the memory 1020 may contain, among other things, software or firmware code for use in implementing at least some of the embodiments of the invention introduced herein.

Also connected to the processor(s) 1010 through the interconnect 1060 is a communications interface 1040, such as, but not limited to, a network adapter, one or more output device(s) 1030 and one or more input device(s) 1050. Note that the output device(s) 1030 and the input device(s) 1050, like other devices, are optional. The communications interface 1040 provides the architecture 1000 with the ability to communicate with other components in the space adjusting system 100 and may be, for example, an Ethernet adapter or Fibre Channel adapter. The input device 1050 may include a touch screen, keyboard, and/or mouse, etc. The output device 1030 may include a screen and/or speakers, etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "module", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Figure 2:
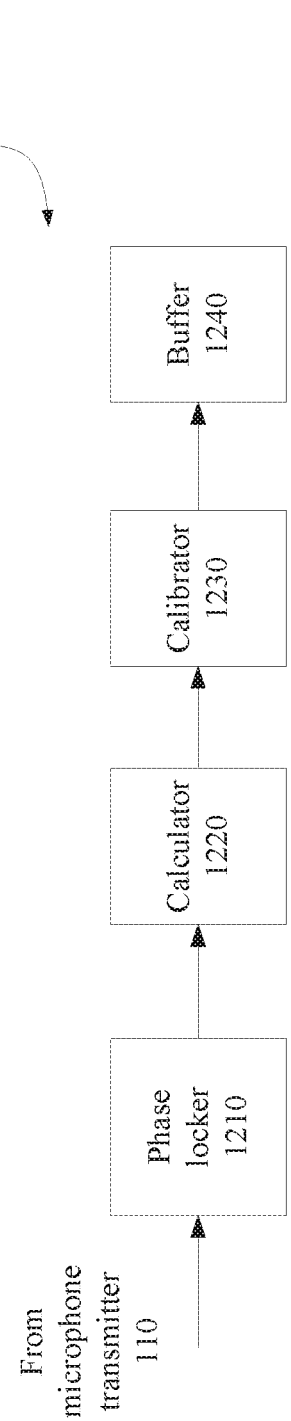
FIG. 2 is a system block diagram illustrating a wireless microphone receiver according to an embodiment of the invention.

FIG. 2 is a system block diagram illustrating a wireless microphone receiver 120 according to an embodiment of the invention.

The wireless microphone receiver 120 comprises a phase locker 1210, a calculator 1220, a calibrator 1230 and a buffer 1240. The phase locker 1210 is communicatively coupled to the calculator 1220. The calculator 1220 is communicatively coupled to the calibrator 1230. The calibrator 1230 is communicatively coupled to the buffer 1240.

The phase locker 1210 is configured to lock a phase of an audio data successfully received from a wireless microphone transmitter 110. After the wireless microphone receiver 120 is powered on, the microphone receiver 120 continuously monitors the received audio data. Upon correct receipt of an audio data package (or in other words, the audio codec of the receiver correctly decode the audio data package. Usually at this time, the frequency offset between the wireless microphone receiver clock and wireless microphone transmitter clock is less than 120 ppm), the wireless microphone receiver 120 will lock phase of the received audio data. Although not shown in FIG. 2, the receiver further comprises a clock connected to the calibration 1230 and configured to feed a clock count to the calibrator 1220. The clock may be implemented by a crystal. The frequency offset is adjusted by adjusting the size of payload capacitor of the clock, therefore realizing frequency calibration.

The calculator 1220 is communicatively coupled to the phase locker 1210 and configured to calculate a frequency offset between the locked phase of the wireless microphone transmitter 110 and the phase of the wireless microphone receiver 120. To be specific, after the phase of the received audio data is locked, the calculator 1220 calculates the actual frequency offset between the wireless microphone receiver 120 and the wireless microphone transmitter 110. For example, the calculator 1220 counts the number of received audio data on the receiver side for a long time, for example, for 576 millisecond (ms) (for 512 slots, each slot lasts for 1.125 ms, therefore the total time is 576 ms) using the clock of the wireless microphone receiver 120. The number of counted received audio data using the wireless microphone receiver 120 clock is compared with the number of received audio data that is counted with a transmitter clock. Note the difference between the number counted by the wireless microphone receiver 120 clock and the number counted by the transmitter clock represents frequency offset between the wireless microphone transmitter 110 and the wireless microphone receiver 120.

Alternatively, the calculator 1220 is further configured to calculate the frequency offset by counting a number of synchronous headers in the locked phase actually received from the wireless microphone receiver 120 and compare the number of the actually received synchronous headers with a number of synchronous headers of an ideal wireless microphone receiver with no delay with the wireless microphone transmitter 110.

The calibrator 1230 is communicatively coupled to the calculator 1220 and configured to calibrate the frequency offset using a first step if the frequency offset is larger than a first predetermined threshold, and calibrate the frequency offset with a second step if the frequency offset is smaller than or equal to the first predetermined threshold, wherein the second step is smaller than the first step. The calibrator 1230 is further configured to complete the calibration if a calibrated frequency offset is smaller than a second threshold. For example, the first threshold may be 4 ppm and the second threshold may be 1 ppm. The first step is at most 20 ppm, and the second step is 1 least significant bit (LSB) or 1 ppm. If the actual frequency offset is smaller than 4 ppm, then the calibration 1230 uses fine tuning with the second step of 1 ppm, and if the actual frequency offset is larger than or equals 4 ppm, then the calibration 1230 uses coarse tuning with the first step of, for example, 20 ppm.

Alternatively, a fine tuning is started after the phase offset is smaller than 4 ppm for three times. During the coarse tuning, the tuning step is determined based on the crystal characters. For example, the number of bits per ppm is a constant, which is determined by the crystal feature. In an embodiment, to adjust 1 ppm, the calibrator 1230 needs to adjust 1 bit. According to an embodiment, a maximum step is 20 ppm.

Alternatively or additionally, the calibrator 1230 is further configured to calibrate the frequency offset with a second step if the calibrator repeats the calibration and the frequency offset to be calibrated is smaller than or equal to the second predetermined threshold for three times. For example, a fine tuning with the second step of 1 ppm is started after the phase offset is smaller than 4 ppm for three times. During fine tuning, each time only one LSB is adjusted, and the receiver 120 finally reaches a status where the resulting phase offset is smaller than 1 ppm. If the frequency offset is smaller than the first predetermined threshold 4 ppm, the buffer enables a little slower and fine calibration of the phase offset. Further, the calculation of phase offset may use statistical average, and using three times can filter out error statistics, such as loss of package in the statistical process. In an embodiment, the calibration may use the statistic from three consecutive times. Those skilled in the art can appreciate to use other predetermined times instead of three times.

Alternatively or additionally, the calculator 1220 is further configured to calculate the frequency offset of the locked phase by counting a number of synchronous headers in the locked phase actually received from the wireless microphone receiver 120 and compare the number of the actually received synchronous headers with a number of synchronous headers of an ideal wireless microphone receiver with no delay with the wireless microphone transmitter 110.

The buffer 1240 is communicatively coupled to the calibrator 1230 and configured to buffer the audio data received from the microphone transmitter 120, and the calibrator 1230 is further configured to adjust the amount of data stored in the buffer. The wireless microphone receiver 120 is further configured to output buffered audio data from the buffer 1240.

The buffer 1240 is used to buffer the received audio data. The buffer 1240 transmits the buffered audio data to receiver's audio CODEC (not shown in the drawings) in a First In First Out (FIFO) manner. An audio CODEC is a device or computer program capable of coding or decoding a digital data stream of audio. In software, an audio CODEC is a computer program implementing an algorithm that compresses and decompresses digital audio data according to a given audio file or streaming media audio coding format. In hardware, audio CODEC refers to a single device that encodes analog audio as digital signals and decodes digital back into analog. In other words, it contains both an analog-to-digital converter (ADC) and digital-to-analog converter (DAC) running off the same clock. The purpose of calibrating phase offset is to enable dynamic balance of the buffer. The purpose includes, for example, to avoid overflow of buffer caused by receiving clock being slower than the transmitting clock, and to avoid failure to read data due to that receiving clock is faster than the transmitter clock.

Referring to FIG. 2, additionally, the wireless microphone receiver 120 further comprises a capacitor bank 200 comprising a plurality of capacitors, and the calibrator 1230 calibrates the frequency offset by switching on/off at least one of the plurality of capacitors. According to an embodiment, one ppm corresponds to one bit in the register, which corresponds to one least significant bit (LSB) capacitance, or 0.1 pF.

Alternatively or additionally, the second step is 1 per parts per million (ppm) and the first step is 20 ppm.

Figure 3:
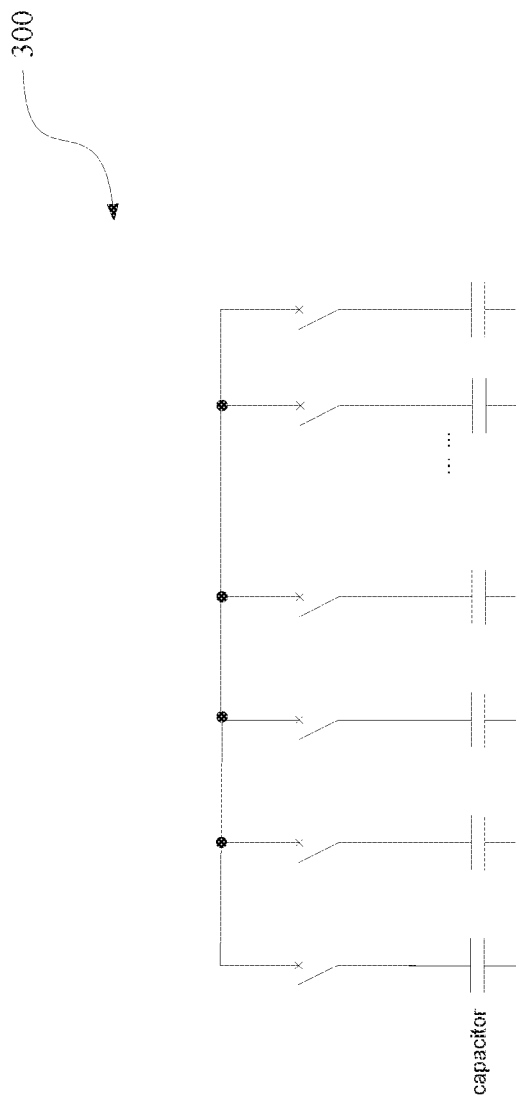
FIG. 3 is a circuit diagram illustrating a capacitor bank according to an embodiment of the invention.

FIG. 3 is a circuit diagram illustrating a capacitor bank 300 according to an embodiment of the invention. As shown in FIG. 3, the capacitor bank 300 comprising a plurality of capacitors. The method implements calibrating, by the calibrator, the frequency offset by switching on/off at least one of the plurality of capacitors.

Figure 4:
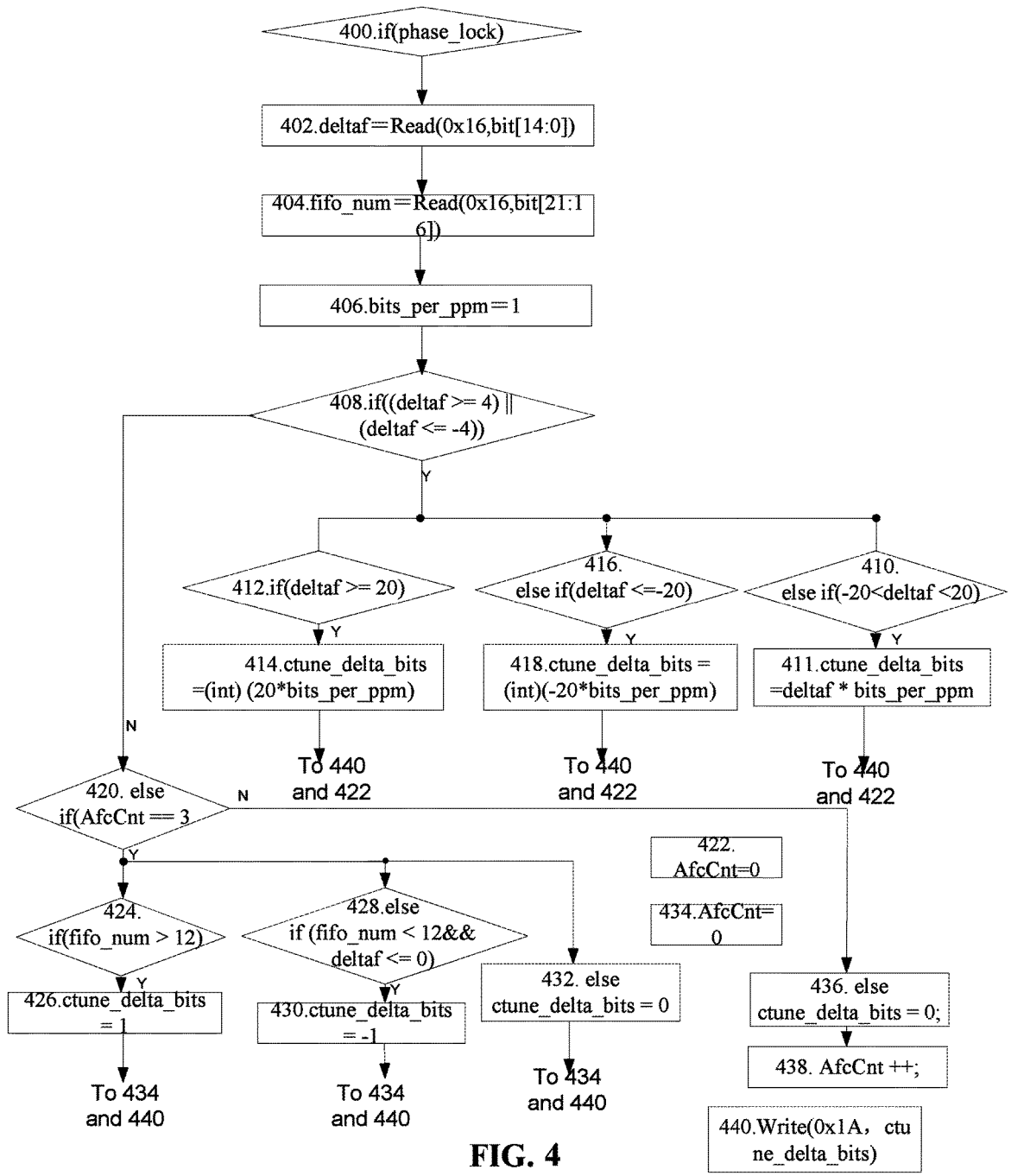
FIG. 4 is a flow chart illustrating a method of calibrating frequency offset according to an embodiment of the invention.

FIG. 4 is a flow chart illustrating a method of calibrating frequency offset according to an embodiment of the invention.

if(phase lock) // In block 400, if the phase is locked, the receiver 120 starts to read the calculated frequency offset.
{
    deltaf=Read(0x16,bit[14:0]); // In block 402, the receiver 120 reads bit 0 to bit 14 of the Register REG16 as the frequency offset deltaf fifo_num=Read(0x16,bit[21:16]) // In block 304, the receiver 10 reads bit 16 to bit 21 of the Register REG16 as the buffered data fifo_num.

bits_per_ppm=1// In block 406, the receiver adjusts 1 bit per ppm, and the relationship between the ppm and bit are determined by the crystal features of receiver and transmitter.

if((deltaf>=4)||(deltaf<=-4))     //群山: 是的, 就是 bits_per_ppm 的值, 由其体晶体特性决定, 一般该佔 0.5~2, 这里取了 1. In block 408, the receiver 120 determines whether the absolute value of the frequency offset deltaf is larger than 4 ppm. If the result is larger than 4 ppm, the receiver 120 decides to use a first step, or in other words, the receiver 120 decides to use coarse tuning. Note the crystal feature determines the relationship between bit and ppm, that is, the value of bits_per_ppm. The bits_per_ppm normally takes the value ranging from 0.5 to 2. In an embodiment, the value is taken as 1.

{ // In blocks 412-418, coarse tuning is limited to within 20 ppm. If the frequency offset deltaf is larger than 20 ppm, the receiver 120 will only take 20 ppm. Note ctune_delta_bits value is determined by deltaf; when deltaf is larger than 20 ppm, deltaf takes the value of 20 ppm; when deltaf is smaller than 20 ppm and larger than 4 ppm, ctune_delta_bits equals deltaf equals deltaf*bits_per_ppm; when deltaf is smaller than 4 ppm, deltaf takes the value of 1 ppm.

if(deltaf>=20) ctune_delta_bits=(int)(20*bits_per_ppm); // In block 420, AfcCnt is used to count the number for fine tuning.

else if(deltaf<=-20) ctune_delta_bits=(int)(-20*bits_per_ppm);

else if(-20<deltaf<20) ctune_delta_bits=deltaf*bits_per_ppm; // In block 410, the receiver 120 determines the tuning value ctune_delta_bits to use is the actual offset deltaf*bits_per_ppm if the frequency offset is smaller than 20 and larger than 4.

AfcCnt=0;// In block 422, AfcCnt is used to count the number for fine tuning. Note AfcCnt=0 performs following each of the three clauses if(deltaf>=20), else if(deltaf<=-20) and else if(-20<deltaf<20). In other words, block 422 performs after each of blocks 414, 418 and 411.
} else if(AfcCnt==3) // In block 422, if the absolute value of the frequency offset is smaller than 4 ppm, and it has been accumulated to three times that the absolute values of the frequency offset are smaller than 4 ppm, or in other word, the count AfcCnt of fine tuning is three, then the receiver 120 starts fine tuning with a second step smaller than the first step.

{//According to whether the buffer data increases or decreases, the receiver 120 decides whether to tune up the frequency of the receiver 120 or tune down the frequency of the receiver 120. Further, each time only 1LSB is adjusted, so as to ensure a stable adjustment, and ensure that the number of buffered data is about 12.

if(fifo_num>12) ctune_delta_bits=1;// In blocks 424 and 426, if the buffered data size (or the amount of data stored in the buffer) fifo_num increases, such as the buffered data size is larger than 12, the adjustment ctune_delta_bits is increased by 1, so that the received data can catch up with the transmitted data.

else if(fifo_num<12 && deltaf<=0) ctune_delta_bits=-1; // In blocks 428 and 430, if the buffer fifo_num decreases, such as the buffered data size is smaller than 12 and the phase offset is smaller than 0, the adjustment ctune_delta_bits is decreased by 1.

else ctune_delta_bits=0;// Otherwise, in block 432, the buffer is not adjusted, that means, the adjustment ctune_delta_bits equals to 0.

AfcCnt=0;// In block 434, AfcCnt is used to count the number for fine tuning. Note AfcCnt=0 performs following each of the three clauses if(fifo_num>12), else if(fifo_num<12 && deltaf<=0) and else. In other words, block 434 performs after each of blocks 426, 430 and 432.
} else
{// In block 436, if the frequency offset is smaller than 4 ppm; however, the situation occurs less than three times, the frequency of the receiver is not adjusted.
ctune_delta_bits=0;
AfcCnt++;// In block 438, AfcCnt, which is used to count the number for fine tuning, is added by 1.
}
}

Write(0x1A, ctune_delta_bits); // In block 440, the final adjusted capacitance value is written into Register 1A, which has a final resulting phase offset of less than 1 ppm. Note results of all blocks 414, 418, 426, 430, 432 are written into register 1A.

Figure 5:
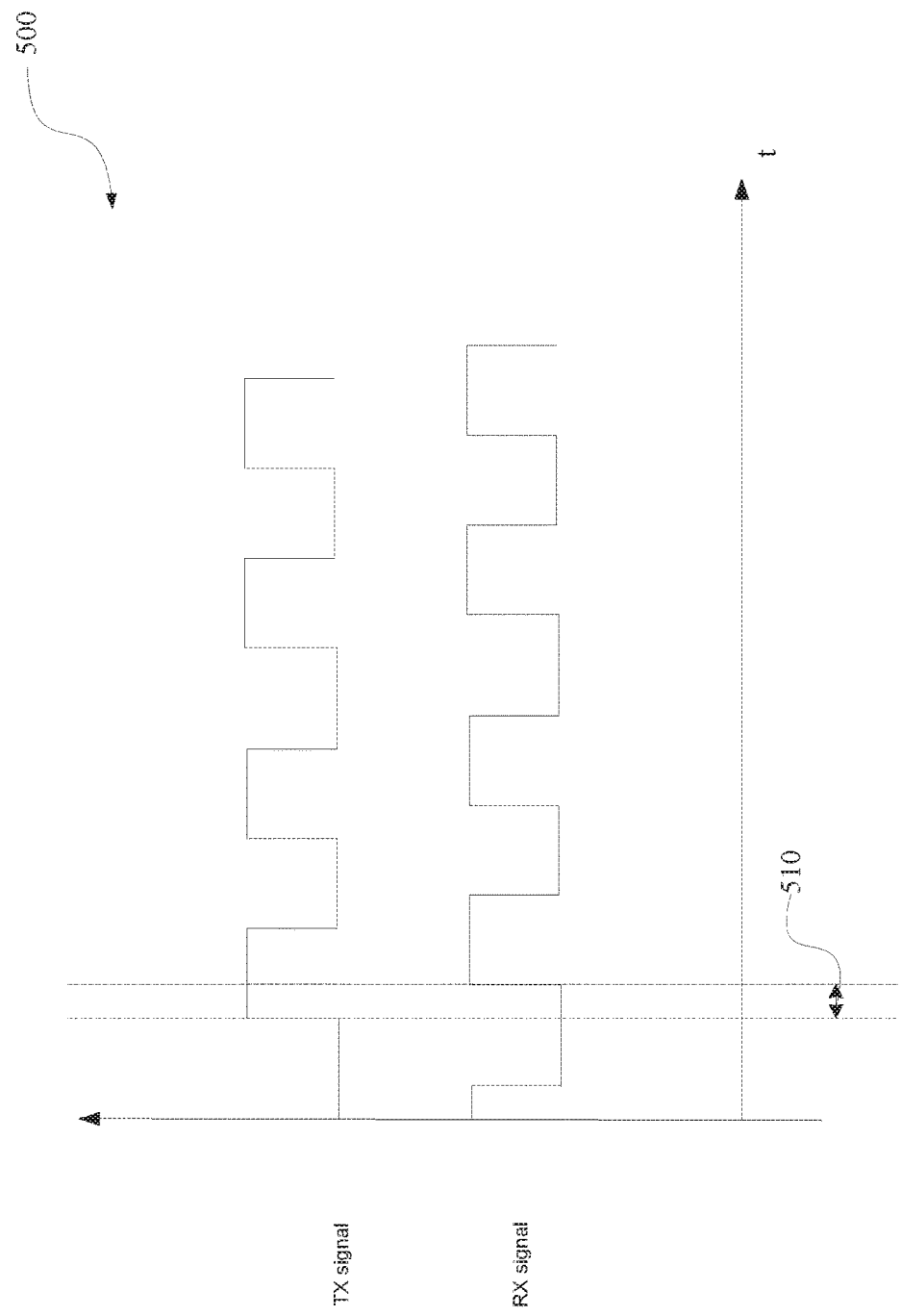
FIG. 5 is a sequence diagram according to an embodiment of the invention.

FIG. 5 is a sequence diagram 500 according to an embodiment of the invention. In FIG. 5, the phase offset between the transmitter and the receiver is illustrated as 510.

Figure 6:
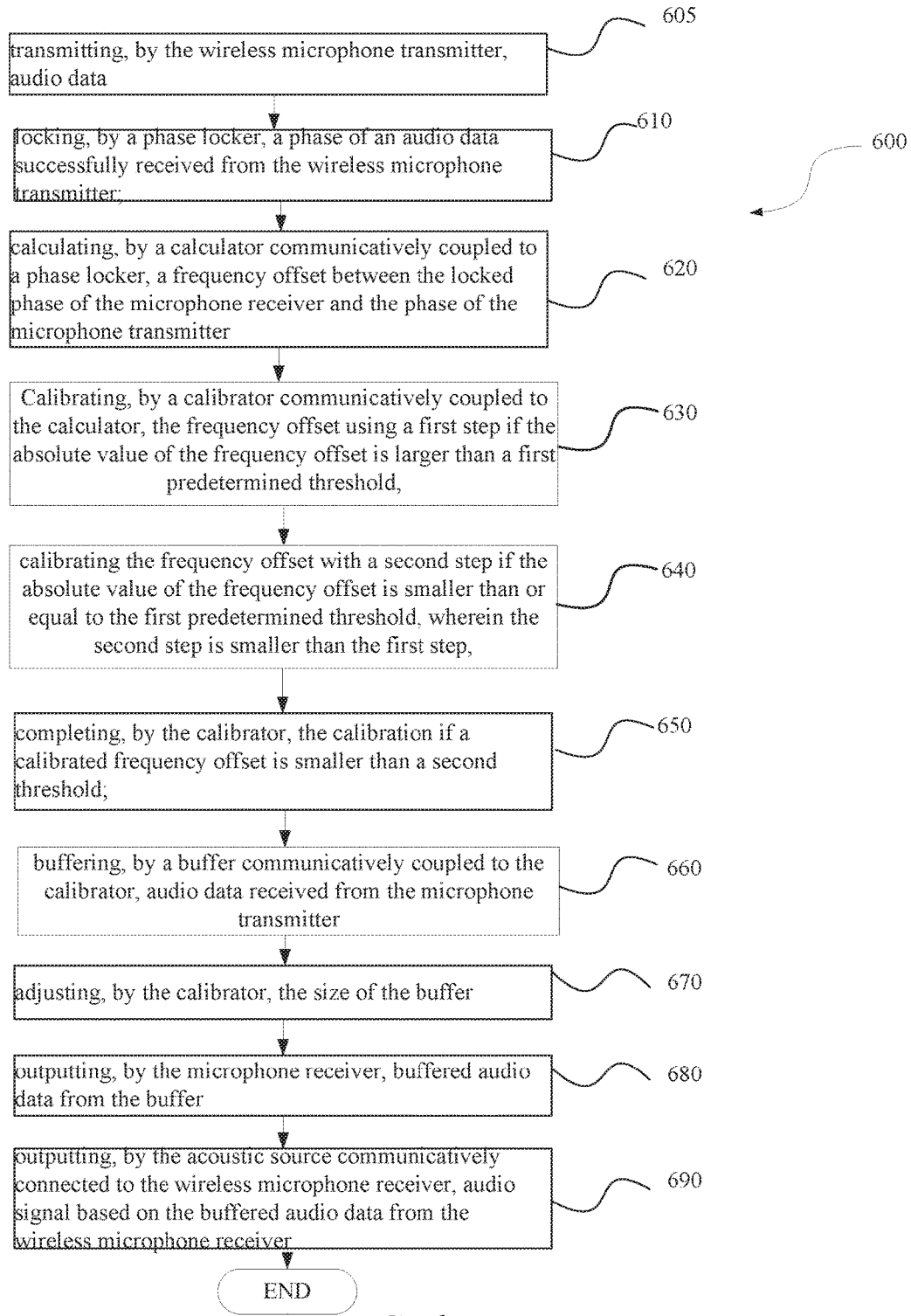
FIG. 6 is a flow chart illustrating a method according to an embodiment of the invention.

FIG. 6 is a flow chart illustrating a method 600 according to an embodiment of the invention.

The method 600 occurs in a wireless microphone receiver, wherein the wireless microphone receiver comprises a phase locker, a calculator and a calibrator. The method 600 comprises transmitting in block 605, by the wireless microphone transmitter, audio data; locking in block 610, by the phase locker, a phase of an audio data successfully received from the wireless microphone transmitter; calculating in block 620, by a calculator communicatively coupled to a phase locker, a frequency offset between the locked phase of the wireless microphone receiver and the phase of the wireless microphone transmitter; calibrating in block 630, by a calibrator communicatively coupled to the calculator, the frequency offset using a first step if the absolute value of the frequency offset is larger than a first predetermined threshold, and calibrating in block 640 by the calibrator, the frequency offset with a second step if the absolute value of the frequency offset is smaller than or equal to the first predetermined threshold, wherein the second step is smaller than the first step, completing in block 650, by the calibrator, the calibration if a calibrated frequency offset is smaller than a second threshold; buffering in block 660, by a buffer communicatively coupled to the calibrator, audio data received from the wireless microphone transmitter, adjusting in block 670, by the calibrator, the amount of data stored in the buffer; and outputting in block 680, by the wireless microphone receiver, buffered audio data from the buffer, and outputting in block 690, by the acoustic source communicatively connected to the wireless microphone receiver, audio signal based on the buffered audio data from the wireless microphone receiver.

Alternatively or additionally, the wireless microphone receiver further comprises a capacitor bank comprising a plurality of capacitors, and the method 500 further comprises (not shown in the drawings) calibrating, by the calibrator, the frequency offset by switching on/off at least one of the plurality of capacitors.

Alternatively or additionally, the method 500 further comprises: calibrating, by the calibrator, the frequency offset with a second step if the calibrator repeats the calibration and the frequency offset to be calibrated is smaller than or equal to the second predetermined threshold for three times.

Alternatively or additionally, the method 500 further comprises calculating, by the calculator, the frequency offset of the locked phase by counting a number of synchronous headers in the locked phase actually received from the wireless microphone receiver; and comparing, by the calculator, the number of the actually received synchronous headers with a number of synchronous headers of an ideal wireless microphone receiver with no delay with the wireless microphone transmitter.

Alternatively or additionally, the second step is 1 per parts per million (ppm) and the first step is 20 ppm.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A wireless apparatus, comprising:
 a wireless microphone transmitter configured to transmit audio data, and
 a wireless microphone receiver communicatively connected to the wireless microphone transmitter, wherein the wireless microphone receiver comprises
   a phase locker, configured to lock a phase of an audio data successfully received from the wireless microphone transmitter;
   a calculator communicatively coupled to the phase locker and configured to calculate a frequency offset between the locked phase of the wireless microphone receiver and the phase of the wireless microphone transmitter;
   a calibrator communicatively coupled to the calculator and configured to calibrate the frequency offset using a first step if the absolute value of the frequency offset is larger than a first predetermined threshold, and calibrate the frequency offset with a second step if the absolute value of the frequency offset is smaller than or equal to the first predetermined threshold, wherein the second step is smaller than the first step, wherein the calibrator is further configured to complete the calibration if a calibrated frequency offset is smaller than a second threshold;
   a buffer communicatively coupled to the calibrator and configured to buffer the audio data received from the wireless microphone transmitter, and the calibrator is further configured to adjust the amount of data stored in the buffer; and
   the wireless microphone receiver is further configured to output buffered audio data from the buffer; and
 an acoustic source communicatively connected to the wireless microphone receiver and configured to output audio signal based on the buffered audio data from the wireless microphone receiver.

2. The wireless apparatus of claim 1, wherein the wireless microphone receiver further comprises a capacitor bank comprising a plurality of capacitors, and the calibrator calibrates the frequency offset by switching on/off at least one of the plurality of capacitors.

3. The wireless apparatus of claim 1, wherein the calibrator is further configured to calibrate the frequency offset with a second step if the calibrator repeats the calibration and the frequency offset to be calibrated is smaller than or equal to the second predetermined threshold for three times.

4. The wireless apparatus of claim 1, wherein
 the calculator is further configured to calculate the frequency offset of the locked phase by counting a number of synchronous headers in the locked phase actually received from the wireless microphone receiver and compare the number of the actually received synchronous headers with a number of synchronous headers of an ideal wireless microphone receiver with no delay with the wireless microphone transmitter.

5. The wireless apparatus of claim 1, wherein the second step is 1 per parts per million (ppm) and the first step is 20 ppm.

6. A method in a wireless apparatus, wherein the wireless apparatus comprises a wireless microphone transmitter, a wireless microphone receiver and an acoustic source, and the wireless microphone receiver further comprises a phase locker, a calculator and a calibrator, wherein the method comprises:
 transmitting, by the wireless microphone transmitter, audio data;
   locking, by a phase locker, a phase of an audio data successfully received from the wireless microphone transmitter;
   calculating, by a calculator communicatively coupled to the phase locker, a frequency offset between the locked phase of the wireless microphone transmitter and the phase of the wireless microphone receiver;
   calibrating, by the calibrator communicatively coupled to the calculator, the frequency offset using a first step if the absolute value of the frequency offset is larger than a first predetermined threshold, and calibrate the frequency offset with a second step if the absolute value of the frequency offset is smaller than or equal to the first predetermined threshold, wherein the second step is smaller than the first step, and
   completing, by the calibrator, the calibration if a calibrated frequency offset is smaller than a second threshold;
   buffering, by the buffer communicatively coupled to the calibrator, audio data received from the wireless microphone transmitter,
   adjusting, by the calibrator, the amount of data stored in the buffer; and
   outputting, by the wireless microphone receiver, buffered audio data from the buffer; and outputting, by the acoustic source communicatively connected to the wireless microphone receiver, audio signal based on the buffered audio data from the wireless microphone receiver.

7. The method of claim 6, wherein the wireless microphone receiver further comprises a capacitor bank comprising a plurality of capacitors, and the method further comprises:
calibrating, by the calibrator, the frequency offset by switching on/off at least one of the plurality of capacitors.

8. The method of claim 6, further comprising:
calibrating, by the calibrator, the frequency offset with a second step if the calibrator repeats the calibration and the frequency offset to be calibrated is smaller than or equal to the second predetermined threshold for three times.

9. The method of claim 6, further comprising:
calculating, by the calculator, the frequency offset of the locked phase by counting a number of synchronous headers in the locked phase actually received from the wireless microphone receiver; and
comparing, by the calculator, the number of the actually received synchronous headers with a number of synchronous headers of an ideal wireless microphone receiver with no delay with the wireless microphone transmitter.

10. The method of claim 6, wherein the second step is 1 per parts per million (ppm) and the first step is 20 ppm.

* * * * *